(12) United States Patent
Shinada et al.

(10) Patent No.: US 9,118,434 B2
(45) Date of Patent: Aug. 25, 2015

(54) OPTICAL TRANSMITTING APPARATUS AND OPTICAL DETECTING APPARATUS

(71) Applicant: Mitsubishi Electric Corporation, Tokyo (JP)

(72) Inventors: Takuro Shinada, Tokyo (JP); Haruki Koyanagi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 69 days.

(21) Appl. No.: 14/072,844

(22) Filed: Nov. 6, 2013

(65) Prior Publication Data
US 2014/0294386 A1  Oct. 2, 2014

(30) Foreign Application Priority Data
Mar. 27, 2013  (JP) .................. 2013-066505

(51) Int. Cl.
| | |
|---|---|
| H04B 10/50 | (2013.01) |
| H04B 10/60 | (2013.01) |
| H04B 10/61 | (2013.01) |
| H04B 10/572 | (2013.01) |
| H04J 14/02 | (2006.01) |
| G02B 6/42 | (2006.01) |
| G02B 6/293 | (2006.01) |

(52) U.S. Cl.
CPC ............ *H04J 14/02* (2013.01); *G02B 6/29362* (2013.01); *G02B 6/42* (2013.01); *G02B 6/4215* (2013.01); *H04B 10/506* (2013.01); *H04B 10/60* (2013.01); *H04B 10/572* (2013.01); *H04B 10/61* (2013.01)

(58) Field of Classification Search
CPC .... H04B 10/506; H04B 10/60; H04B 10/572; H04B 10/61; H04B 10/614; G02B 6/42; G02B 6/29362; G02B 6/4215
See application file for complete search history.

(56) References Cited

U.S. PATENT DOCUMENTS

| | | | | |
|---|---|---|---|---|
| 4,244,045 | A * | 1/1981 | Nosu et al. ............... | 398/86 |
| 2002/0075912 | A1 | 6/2002 | Ito et al. | |
| 2004/0096159 | A1 | 5/2004 | Nagano et al. | |
| 2010/0290128 | A1 | 11/2010 | Sugitatsu | |

FOREIGN PATENT DOCUMENTS

| | | |
|---|---|---|
| JP | 61-205906 A | 9/1986 |
| JP | 2-54207 A | 2/1990 |
| JP | 2000-251312 A | 9/2000 |
| JP | 2002-185075 A | 6/2002 |
| JP | 2004-128058 A | 4/2004 |
| JP | 2010-267734 A | 11/2010 |

* cited by examiner

*Primary Examiner* — Darren E Wolf
(74) *Attorney, Agent, or Firm* — Leydig, Voit & Mayer, Ltd.

(57) ABSTRACT

An optical transmitting apparatus includes semiconductor laser elements. Upon receiving laser beams, a multiplexed beam is emitted from a wavelength multiplexing filter. The wavelength multiplexing filter includes a triangular prism and a wavelength multiplexing filter film. A front end face and a rear end face of the prism are not parallel to each other so that a prism angle at which a surface parallel to the front end face intersects a surface parallel to the rear end face, is an acute angle. The prism angle is the angle at which the laser beam impinging from the front end face into the triangular prism is reflected by the wavelength multiplexing filter film toward the front end face and the multiplexed beam is directed to the optical axis side of the optical fiber.

14 Claims, 9 Drawing Sheets

OPTICAL TRANSMITTING APPARATUS AND OPTICAL DETECTING APPARATUS

BACKGROUND OF THE INVENTION

1. Field of the Invention

The present invention relates to an optical transmitting apparatus and an optical receiving apparatus.

2. Background Art

Among optical communication techniques in recent years, wavelength division multiplex (WDM) is becoming widespread in which optical signals of different wavelengths are carried on one optical fiber so that optical signals of a plurality of channels are transmitted using one optical fiber. For example, as disclosed in Japanese Patent Laid-Open No. 2010-267734, there are known an optical transmitting apparatus and an optical receiving apparatus which multiplex or demultiplex laser beams of a plurality of wavelengths using a wavelength filter.

The wavelength filter is generally a prism provided with a wavelength filter film (dichroic coat in the above technique). According to the technique described in the above publication, the wavelength filter is mainly configured using not a parallel flat prism but a triangular prism. FIG. 3 in this document also discloses an optical transmitting apparatus using a parallel flat prism.

Although not related to optical communication, Japanese Patent Laid-Open No. 2010-267734 discloses an optical pickup for an optical disk drive. According to this publication, an optical path synthesizing prism is formed by applying a dichroic coat to a prism having an inclined surface.

Other prior art includes Japanese Laid-Open Patent Publication No. 2000-251312, Japanese Laid-Open Patent Publication No. H2-54207, Japanese Laid-Open Patent Publication No. S61-205906, Japanese Laid-Open Patent Publication No. 2004-128058, and Japanese Laid-Open Patent Publication No. 2002-185075.

Requirements for a wavelength filter for realizing optical communication include a requirement for increasing an optical path changing angle and a requirement for reducing an angle of incidence of a filter.

More specifically, first, the requirement for increasing an optical path changing angle is as follows. The "optical path changing angle" defined here for convenience is an angle related to positional relationships when an optical element, wavelength filter and optical fiber or the like are arranged. The optical element is a semiconductor laser for an optical transmitting apparatus or a photodiode for an optical receiving apparatus. The optical path changing angle is, more specifically in the case of a transmitting apparatus, an angle formed by an optical axis of a laser beam incident on a wavelength filter for multiplexing and an optical axis of a multiplexing laser beam emitted from the wavelength filter. In the case of an optical receiving apparatus, the optical path changing angle is an angle formed by an optical axis of a laser beam after wavelength demultiplexing to be received by a photodiode and an optical axis of a laser beam incident on the wavelength filter before wavelength demultiplexing.

When this optical path changing angle is too small, the optical axis of the laser beam incident on the wavelength filter is too close to the optical axis of the laser beam emitted. In this way, the optical fiber or the like and the optical element are aligned on the same line. An apparatus for performing wavelength division multiplexed communication is made up of a plurality of optical elements, a wavelength filter and an optical fiber aligned side by side. Decreasing the optical path changing angle involves a problem that it is difficult to accommodate the respective components in a compact space while avoiding mutual interference.

On the other hand, the requirement for reducing the angle of incidence of the filter is as follows. The angle of incidence of the filter is an angle of incidence of a laser beam with respect to the wavelength filter. Transmission characteristics of the wavelength filter are greatly dependent on the angle of incidence of the filter. To be more specific, regarding transmission characteristics of the wavelength filter, the smaller the angle of incidence of the filter, the more advantageous the angle tolerance and wavelength tolerance become. Especially in LAN-WDM or DWDM compared to CWDM, since the wavelength differences between a plurality of neighboring laser beams become smaller, more stringent specifications are required for the transmission characteristics of the wavelength filter. Therefore, the angle of incidence of the filter is required to be minimized.

The conventional optical communication apparatus disclosed in Japanese Patent Laid-Open No. 2010-267734 uses a triangular prism or parallel flat prism, but it has been unavoidable to increase the angle of incidence of the filter.

SUMMARY OF THE INVENTION

The present invention has been implemented to solve the aforementioned problems and it is an object of the present invention to provide an optical transmitting apparatus and an optical receiving apparatus that make a requirement for increasing an optical path changing angle compatible with a requirement for decreasing an angle of incidence of a filter.

According to one aspect of the present invention, an optical transmitting apparatus includes: a first laser emitting section, a second laser emitting section, and a wavelength filter section. The optical transmitting apparatus also includes an optical fiber or a fiber fixing section. The first laser emitting section emits a first laser beam. The second laser emitting section emits a second laser beam having a wavelength different from that of the first laser beam. The wavelength filter section receives the first laser beam and the second laser beam, and emits a multiplexed beam obtained by multiplexing the first laser beam and the second laser beam. The optical fiber couples to the multiplexed beam. The fiber fixing section fixes the optical fiber.

In the one aspect, the wavelength filter section includes: a prism and a wavelength filter film. The prism is provided with a front end face and a rear end face facing each other, receives the second laser beam on the front end face and receives the first laser beam on the rear end face. The wavelength filter film is provided on the rear end face, allows to transmit the first laser beam that impinges on the rear end face, reflects the second laser beam impinged from the front end face and thereby multiplexes the first laser beam and the second laser beam. The front end face and the rear end face are not parallel to each other so that a prism angle which is an angle at which a surface parallel to the front end face intersects with a surface parallel to the rear end face becomes an acute angle. The prism angle is an angle at which the second laser beam impinged from the front end face into the prism is reflected by the wavelength filter film toward the front end face and the multiplexed beam is directed to an optical axis side of the optical fiber.

According to another aspect of the present invention, an optical receiving apparatus includes: a wavelength filter section, a first laser beam receiving section, and a second laser beam receiving section. The optical receiving apparatus also includes an optical fiber or a fiber fixing section. The wavelength filter section receives a multiplexed beam obtained by multiplexing a first laser beam and a second laser beam having a wavelength different from that of the first laser beam and demultiplexes the multiplexed beam into the first laser beam and the second laser beam. The first laser beam receiving section receives the first laser beam. The second laser beam receiving section receives the second laser beam. The optical fiber transmits the multiplexed beam to the wavelength filter section. The fiber fixing section fixes the optical fiber.

In another aspect, the wavelength filter section includes: a prism and a wavelength filter film. The prism is provided with a front end face and a rear end face facing each other, receives the multiplexed beam on the front end face, emits the second laser beam from the front end face and emits the first laser beam from the rear end face. The wavelength filter film is provided on the rear end face, allows to transmit the first laser beam on the rear end face, reflects the second laser beam impinged from the front end face and thereby demultiplexes the first laser beam and the second laser beam. The front end face and the rear end face are not parallel to each other so that a surface parallel to the front end face and a surface parallel to the rear end face intersect with each other at an acute prism angle. The prism angle is an angle at which the second laser beam of the multiplexed beam impinged from the front end face into the prism is reflected by the wavelength filter film toward the front end face and the reflected second laser beam is directed to an optical axis side of the second laser beam receiving section.

Other and further objects, features and advantages of the invention will appear more fully from the following description.

DETAILED DESCRIPTION OF THE PREFERRED EMBODIMENTS

First Embodiment

Configuration of Apparatus According to First Embodiment (Overall Configuration)

Figure 1:
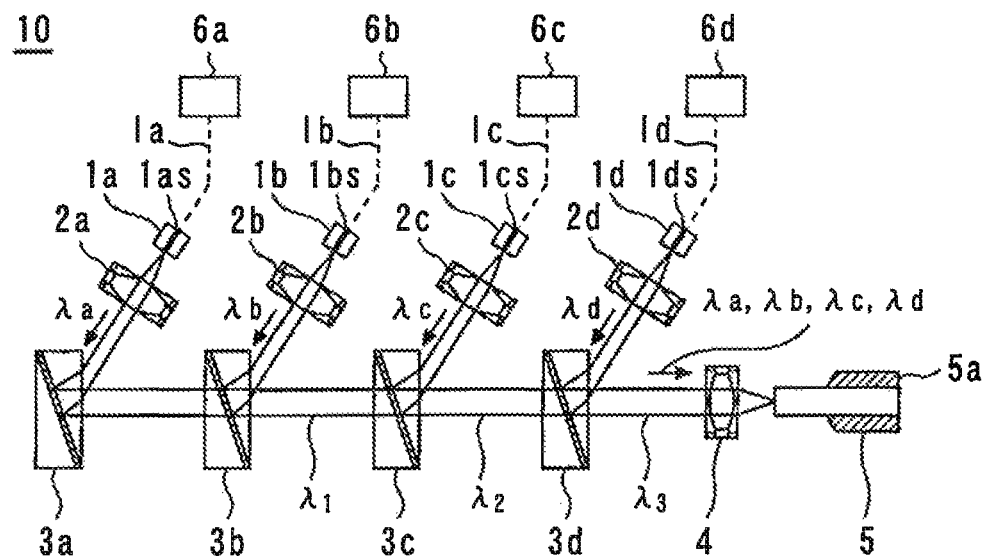
FIG. 1 is a diagram illustrating an overall configuration of an optical transmitting apparatus according to a first embodiment of the present invention.

FIG. 1 is a diagram illustrating an overall configuration of an optical transmitting apparatus 10 according to a first embodiment of the present invention. The optical transmitting apparatus 10 is provided with semiconductor laser elements $1a$, $1b$, $1c$ and $1d$. As shown in FIG. 1, the semiconductor laser elements $1a$, $1b$, $1c$ and $1d$ emit laser beams having wavelengths of $\lambda a$, $\lambda b$, $\lambda c$ and $\lambda d$ respectively. For convenience, the laser beams having wavelengths of $\lambda a$, $\lambda b$, $\lambda c$ and $\lambda d$ may be described hereinafter with reference characters added thereto such as laser beams $\lambda a$, $\lambda b$, $\lambda c$ and $\lambda d$ respectively. The semiconductor laser elements $1a$, $1b$, $1c$ and $1d$ are provided with ridge stripe parts $1as$, $1bs$, $1cs$ and $1ds$ respectively.

The laser beams emitted from the semiconductor laser elements $1a$, $1b$, $1c$ and $1d$ are converted to parallel beams after passing through lenses $2a$, $2b$, $2c$ and $2d$ which are collimator lenses and impinge on wavelength demultiplexing filters $3a$, $3b$, $3c$ and $3d$ respectively. Various kinds of publicly known wavelength demultiplexing filters for multiplexing laser beams are applicable to the wavelength demultiplexing filters $3a$, $3b$, $3c$ and $3d$.

A multiplexed beam $\lambda 1$ results from multiplexing the laser beams $\lambda a$ and $\lambda b$ and a multiplexed beam $\lambda 2$ results from multiplexing the laser beams $\lambda a$, $\lambda b$ and $\lambda c$. The laser beams respectively impinged on the wavelength demultiplexing filters $3a$, $3b$, $3c$ and $3d$ are finally multiplexed into a multiplexed beam $\lambda 3$. Since an optical fiber 5 is provided at a focal position of a lens 4, this multiplexed beam $\lambda 3$ is converted to a condensed beam after passing through the lens 4 and impinges on the optical fiber 5. The optical fiber 5 is fixed by a fiber fixing section $5a$.

The semiconductor laser elements $1a$, $1b$, $1c$ and $1d$ are electrically connected to laser drive circuits $6a$, $6b$, $6c$ and $6d$ respectively. According to laser drive signals $1a$, $1b$, $\lambda c$ and $\lambda d$ from the laser drive circuits $6a$, $6b$, $6c$ and $6d$, the semiconductor laser elements $1a$, $1b$, $1c$ and $1d$ are laser-oscillated and driven. By carrying optical signals of different wavelengths $\lambda a$, $\lambda b$, $\lambda c$ and $\lambda d$ on the one optical fiber 5, the optical transmitting apparatus 10 can transmit optical signals of a plurality of channels via the one optical fiber 5. That is, wavelength division multiplexing (WDM) can be performed.
(Configuration of Wavelength Demultiplexing Filter)

Figure 2:
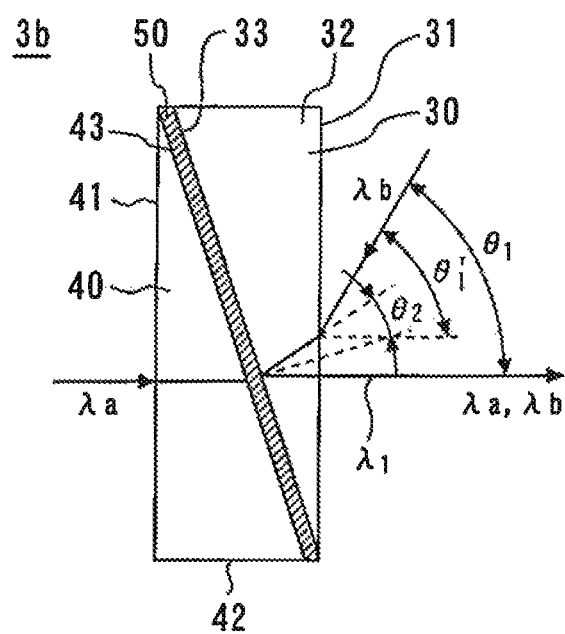
FIG. 2 is a diagram illustrating a configuration of a wavelength demultiplexing filter according to the first embodiment of the present invention.

FIG. 2 is a diagram illustrating a configuration of a wavelength demultiplexing filter according to the first embodiment of the present invention and is a side view illustrating a configuration of the wavelength demultiplexing filter 3b as a typical example thereof. The wavelength demultiplexing filters 3a, 3b, 3c and 3d are respectively provided with a wavelength demultiplexing filter film.

The wavelength demultiplexing filters 3a, 3b, 3c and 3d are different in characteristics of their respective wavelength demultiplexing filter films, but are common in the configuration in which two triangular prisms are bonded together across the wavelength demultiplexing filter film. Therefore, the configuration of the wavelength demultiplexing filter 3b will be described as a typical example here and description of the wavelength demultiplexing filters 3a, 3c and 3d will be omitted because these can be regarded as having similar configurations.

As shown in FIG. 2, the wavelength demultiplexing filter 3b is obtained by bonding right triangular prism-shaped triangular prisms 30 and 40 having the same refractive index to opposite sides of a wavelength demultiplexing filter film 50. A material of the filter is vapor-deposited onto a rear end face 33 of the triangular prism 30 which is a region corresponding to either a diagonal side of the right triangle or a surface 43 of the triangular prism 40.

The triangular prism 30 is further provided with a front end face 31 and a bottom surface 32 that intersects with the front end face 31 at a right angle. The triangular prism 40 is further provided with a rear surface 41 and a bottom surface 42 that intersects with the rear surface 41 at a right angle. Thus, the wavelength demultiplexing filter 3b is provided with the front end face 31 and the rear surface 41 facing this, and the front end face 31 and the rear surface 41 are parallel to each other.

The wavelength demultiplexing filter 3b receives the laser beam λb, to be reflected by the wavelength demultiplexing filter film 50, on the front end face 31, and receives the wavelength demultiplexing laser beam λa, to be transmitted through the filter film 50, on the rear end face 33 and the rear surface 41. The wavelength demultiplexing filter film 50 transmits the wavelength λa and the laser beam λa to that impinges upon the rear surface 41 and the rear end face 33. The wavelength demultiplexing filter 3b reflects the laser beam λb impinging upon the front end face 31 at the same position as that at which the laser beam λa has been transmitted through the rear end face 33, and thereby multiplexes the laser beams λa and λb. As a result, the multiplexed beam λ1 is emitted.

[Operations and Effects of Apparatus of First Embodiment]

Hereinafter, operations and effects of the optical transmitting apparatus 10 will be described with reference to FIGS. 1 and 2. First, items denoted by respective reference numerals in FIG. 2 will be described.

The laser beam λa is a laser beam having a wavelength of λa emitted from the semiconductor laser element 1a. However, as shown in FIG. 1, the laser beam λa is reflected by the wavelength demultiplexing filter 3a and after the optical path thereof is thereby changed, the laser beam λa impinges on the rear surface 41 of the wavelength demultiplexing filter 3b at a substantially right angle.

The laser beam λb is a laser beam having a wavelength of λb emitted from the semiconductor laser element 1b.

The multiplexed beam λ1 is a laser beam generated as a result of multiplexing the laser beam λa and the laser beam λb by the wavelength demultiplexing filter film 50.

A prism angle θp is an angle formed by the front end face 31 and the rear end face 33 as shown in FIG. 2.

An optical path changing angle θ1 is an angle formed by the laser beam λb and the multiplexed beam λ1. Referring to FIG. 1, angles respectively formed by the laser beams λa, λb, λc and λd, and the multiplexed beams λ1, λ2 and λ3 are substantially the same and the optical path changing angle θ1 in the optical transmitting apparatus 10 is substantially constant.

An angle of incidence of the prism θ'1 is an angle of incidence of the laser beam λb with respect to the front end face 31.

An angle of incidence of the filter θ2 is an angle of incidence of the refracted laser beam λb with respect to the rear end face 33 and is an angle of incidence with respect to the wavelength demultiplexing filter film 50.

The prism angle θp, optical path changing angle θ1, angle of incidence of the prism θ'1 and angle of incidence of the filter θ2 in the above description are also applicable to the wavelength demultiplexing filters 3a, 3c and 3d according to the same concept. Regarding the roles of the laser beam λa, laser beam λb and multiplexed beam λ1, the following concepts are applicable to the respective wavelength demultiplexing filters 3a, 3c, and 3d.

That is, the optical transmitting apparatus 10 is made up of a plurality of sets of components for laser emission (that is, laser emitting sections) such as the semiconductor laser elements 1a, 1b, 1c and 1d, and the wavelength demultiplexing filters 3a, 3b, 3c and 3d aligned in series along the optical axis of the optical fiber 5. A multiplexed beam emitted from one of the plurality of wavelength demultiplexing filters 3a to 3d aligned in series impinges on the rear end face of the next wavelength demultiplexing filter.

That is, in the typical example of FIG. 2, since the actual stage is the wavelength demultiplexing filter 3b, the next stage is the wavelength demultiplexing filter 3c, and the multiplexed beam λ1 from the wavelength demultiplexing filter 3b impinges on the rear end face of the wavelength demultiplexing filter 3c of the next stage (position corresponding to the rear end face 33 in FIG. 2 in the wavelength demultiplexing filter 3c). This relationship is likewise applicable to a case where the wavelength demultiplexing filter 3c is the actual stage and the wavelength demultiplexing filter 3d is the next stage.

The front end face 31 is not parallel to the rear end face 33 so that the prism angle θp becomes an acute angle. The prism angle θp is an angle formed when the laser beam λb refracted and impinged into the triangular prism 30 from the front end face 31 is reflected by the wavelength demultiplexing filter film 50 toward the front end face 31 and the multiplexed beam λ1 is directed toward the optical axis side of the optical fiber 5. In the first embodiment, the front end face 31 is perpendicular to the optical axis of the multiplexed beam λ1.

In the present embodiment in which the front end face 31 is not parallel to the rear end face 33, it is possible to design the angle of incidence of the prism θ'1 and the angle of incidence of the filter θ2 independently by changing the prism angle θp.

In the first embodiment, the prism angle θp is defined within a range of angle in which the refracted laser beam λb is reflected by the wavelength demultiplexing filter film 50 toward the front end face 31 so as to ensure that the multiplexed beam λ1 is directed toward the optical axis side of the optical fiber 5. Thus, unlike the mode of use of the triangular prism disclosed in Japanese Patent Laid-Open No. 2010-

267734, a limit is set to the reflection direction of the laser beam so as to ensure that the angle of incidence of the filter θ2 is reduced.

When the optical path changing angle θ1 is assigned (fixed) to a certain value, the angle of incidence of the filter (θ2) which is the angle of incidence of the refracted beam with respect to the wavelength demultiplexing filter film is determined by the angle of incidence of the prism θ'1, a refractive index n of the prism and the prism angle θp. According to the present invention, the front end face 31 and the rear end face 33 of the triangular prism 30 are assumed to be not parallel and by designing the angle between those surfaces (prism angle θp), it is possible, while maintaining the optical path changing angle θ1 to a specified angle, to design the angle of incidence of the prism θ'1 independently of this. As a result, it is possible to determine the prism angle θp that inclines the front end face within an appropriate range for reducing the angle of incidence of the filter θ2 and in an appropriate direction. It is thereby possible to make a requirement for increasing the optical path changing angle θ1 compatible with a requirement for decreasing the angle of incidence of the filter θ2.

To be more specific, in the case of FIG. 2, if the optical path changing angle θ1 is assumed to be 60°, the prism angle θp is 17.6°. In this case, the angle of incidence of the prism θ'1=60°. When the refractive index n is 1.75, the following expression (1) holds true from Snell's law.

$$\sin \theta'1 = n \times \sin \theta 2 \quad (1)$$

As a result, the angle of incidence of the filter θ2=14.85°.

Figure 11:
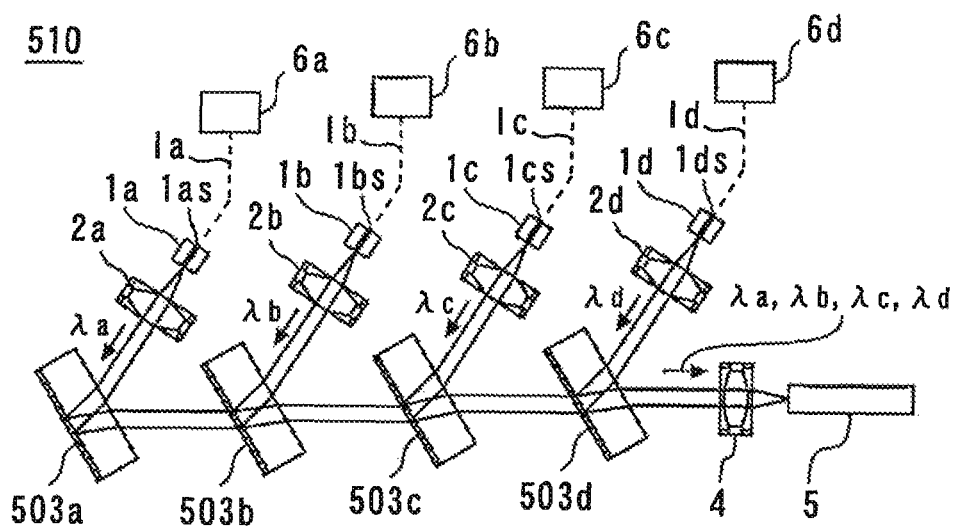
FIG. 11 and FIG. 12 are diagrams illustrating a configuration of an optical transmitting apparatus shown as a comparative example of the first embodiment.
Figure 12:
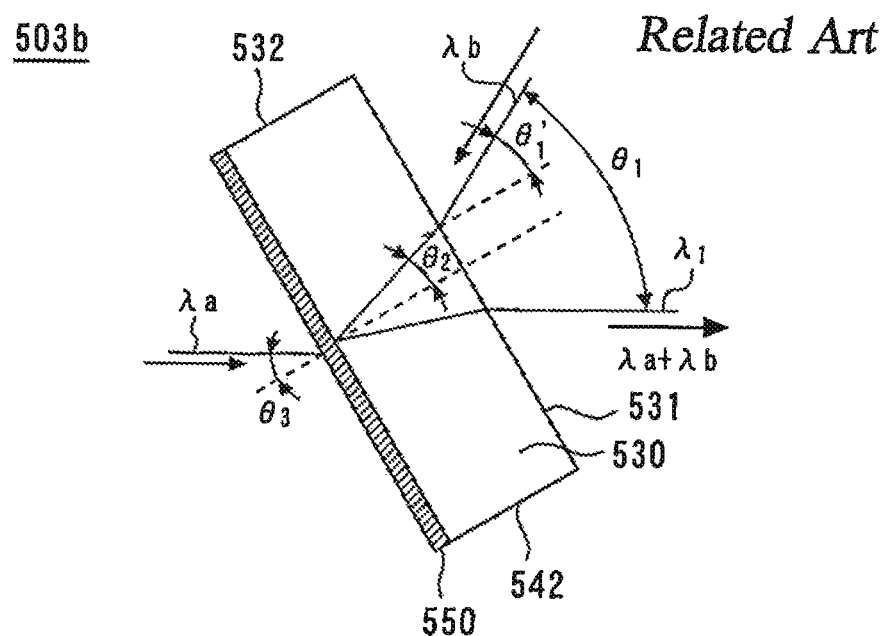

Next, description will be given in comparison with a comparative example. FIG. 11 and FIG. 12 are diagrams illustrating a configuration of an optical transmitting apparatus 510 shown as a comparative example of the first embodiment. FIG. 11 illustrates an overall configuration as with FIG. 1, and FIG. 12 is a side view in which one wavelength demultiplexing filter is extracted and enlarged as with FIG. 2. The optical transmitting apparatus 510 as the comparative example has a configuration similar to that of the optical transmitting apparatus 10 except in that the wavelength demultiplexing filters are replaced by wavelength demultiplexing filters 503a, 503b, 503c and 503d.

As is clear from the wavelength demultiplexing filter 503b illustrated as a typical example in FIG. 12, the wavelength demultiplexing filter 503a, 503b, 503c or 503d is a wavelength demultiplexing filter film 550 vapor-deposited onto a rear end face of a parallel flat prism 530. The concepts of the optical path deviation angle θ1, angle of incidence of the prism θ'1, and angle of incidence of the filter θ2 are similar to those in the first embodiment. Furthermore, θ3 in FIG. 12 is an angle of incidence of a laser beam λa on the rear end face of the wavelength demultiplexing filter 503b.

In the configuration of the comparative example shown in FIG. 12, when an attempt is made to achieve the angle of incidence of the filter θ2=14.85°, the angle of incidence of the prism θ'1 becomes θ'1=26.57° in relation to Snell's law (above expression (1)). In this case, the optical path changing angle θ1 must be narrowed to 53.14°. That is, when the angle of incidence of the filter θ2 is designed with the same small value (θ2=14.85°), θ1 needs to be narrowed down to 53.14°, whereas θ1 can be maintained to 60° in the configuration of FIG. 2 according to the first embodiment.

Furthermore, when the angle of incidence of the prism θ'1 increases, the transmittance of s-polarization in particular decreases, but the present embodiment has no such problem. That is, as shown in FIG. 1, the semiconductor laser diode elements (semiconductor laser elements 1a, 1b, 1c and 1d) are applied as light sources and the active layer of each semiconductor laser diode element is arranged so as to have expansion in the direction parallel to the surface of the sheet in FIG. 1. In other words, this is such an arrangement that the direction in which the semiconductor layers of the respective semiconductor laser diode elements are laminated matches the direction penetrating the surface of the sheet in FIG. 1.

Semiconductor laser diode elements generally have polarization characteristics, and in the arrangement relation according to the present embodiment, an outgoing laser beam in the optical transmitting apparatus 10 becomes p-polarization with respect to the triangular prism 30. Furthermore, it is also an actual circumstance that the wavelength demultiplexing filters can also be created more easily with reference to p-polarization than s-polarization. Thus, according to the present embodiment, optical communication modules can be designed more easily. Furthermore, the present embodiment expands the spot size in the direction parallel to the surface of the sheet in FIG. 1, and can thereby also exert an effect of correcting the spot shape of the semiconductor laser diode which normally has a tendency of expanding in the direction perpendicular to the surface of the sheet.

In the aforementioned first embodiment, the semiconductor laser element 1a, lens 2a and wavelength demultiplexing filter 3a correspond to a "first laser emitting section" according to the first invention and the laser beam λa corresponds to a "first laser beam" according to the first invention. Furthermore, the semiconductor laser element 1b and lens 2b correspond to a "second laser emitting section" and the laser beam λb corresponds to a "second laser beam" in the aforementioned first embodiment.

Furthermore, the wavelength demultiplexing filter 3b corresponds to a "wavelength filter section," the optical fiber 5 corresponds to an "optical fiber," and the fiber fixing section 5a corresponds to a "fiber fixing section" in the aforementioned first embodiment. Furthermore, in the aforementioned first embodiment, the triangular prism 30 corresponds to a "prism" according to the first invention and the wavelength demultiplexing filter film 50 corresponds to a "wavelength filter film."

Modification Example of First Embodiment

Figure 3:
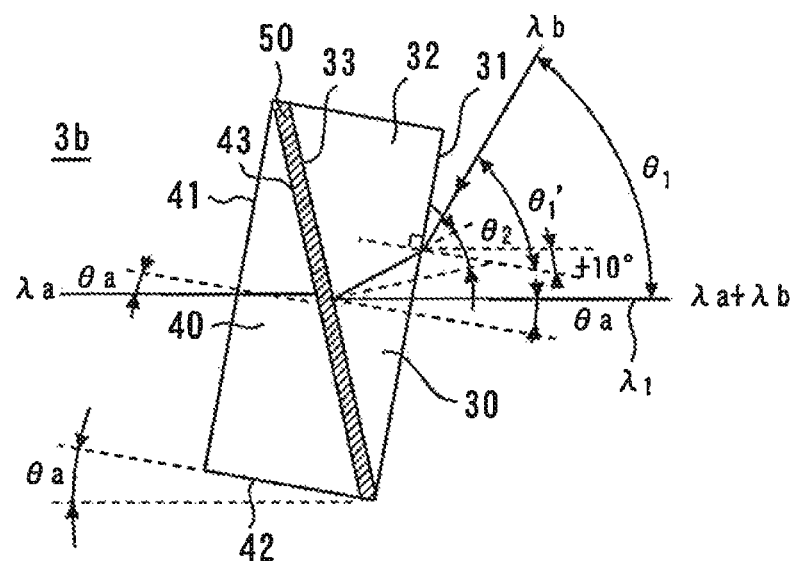
FIG. 3 is a diagram illustrating a modification example of the optical transmitting apparatus according to the first embodiment of the present invention.

Although the front end face 31 is arranged perpendicularly to the optical axis of the multiplexed beam in the first embodiment, the present invention is not limited to this. FIG. 3 is a diagram illustrating a modification example of the optical transmitting apparatus 10 according to the first embodiment of the present invention. In the modification example shown in FIG. 3, the front end face 31 is inclined with respect to the optical axis of the multiplexed beam λ1 so that the angle of incidence of the prism θ'1 exceeds the optical path changing angle θ1. In a manner, as shown in FIG. 3, the wavelength demultiplexing filter 3a is inclined forward.

The angle of inclination θa is assumed to be 10° in the present modification example. The present modification example assumes that such an angle of inclination θa shown in FIG. 3 is provided for all the wavelength demultiplexing filters 3a, 3b, 3c and 3d. This makes it possible to further reduce the angle of incidence of the filter θ2.

To be more specific, when θa=10° is assumed, the angle of incidence of the filter θ2=13.49°, and the angle of incidence of the filter can further be reduced. Furthermore, the wavelength demultiplexing filter 3a is also inclined by θa with respect to the laser beam λa which is transmitted light, and it is thereby possible to reduce an etalon effect.

Second Embodiment

Figure 4:
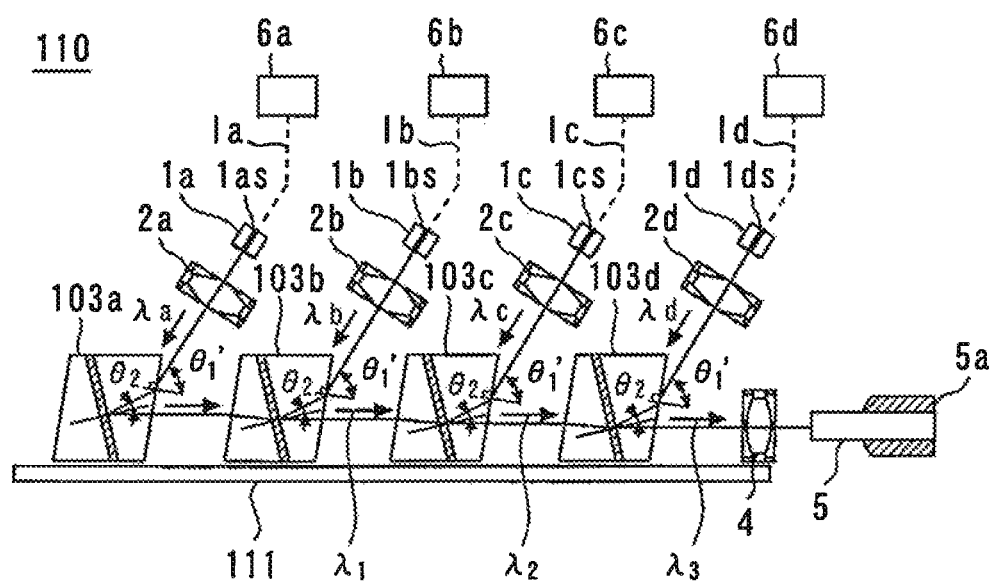
FIG. 4 is a diagram illustrating an overall configuration of an optical transmitting apparatus according to a second embodiment of the present invention.
Figure 5A:
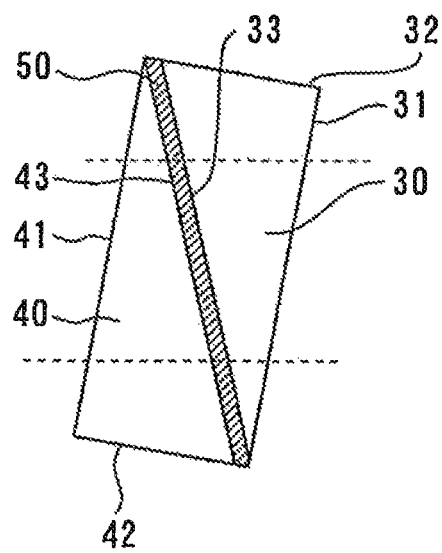
FIGS. 5A and 5B are diagrams illustrating a configuration of a wavelength demultiplexing filter according to the second embodiment of the present invention.
Figure 5B:
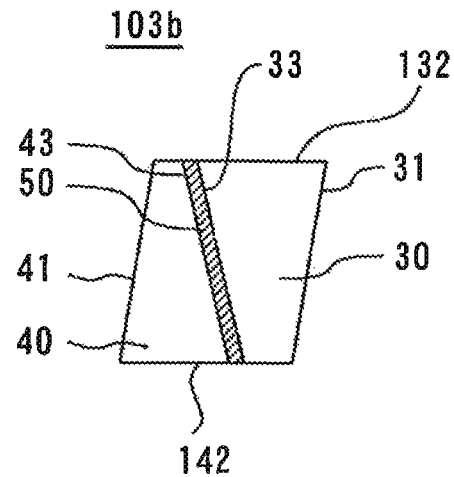

FIG. 4 is a diagram illustrating an overall configuration of an optical transmitting apparatus 110 according to a second embodiment of the present invention. FIG. 5A is a diagram illustrating a configuration of a wavelength demultiplexing filter according to the second embodiment of the present invention and FIG. 5B is a diagram illustrating a configuration of a wavelength demultiplexing filter 103b as a typical example thereof. The optical transmitting apparatus 110 according to the second embodiment is provided with a configuration similar to that of the optical transmitting apparatus 10 according to the first embodiment except in that wavelength demultiplexing filters 103a, 103b, 103c and 103d are used instead of the wavelength demultiplexing filters 3a, 3b, 3c and 3d.

As shown in FIG. 4, the wavelength demultiplexing filters 103a, 103b, 103c and 103d are arranged on a pedestal 111. Here, the configuration of the wavelength demultiplexing filter 103b will be described as a typical example and description of the wavelength demultiplexing filters 103a, 103c and 103d will be omitted assuming that these have similar configurations.

As shown in FIG. 5A, the wavelength demultiplexing filter 103a is a quadrangular prism having a parallelogram cross section. Such a configuration also allows the angle of incidence of the filter θ2 to be designed to be small while maintaining the relatively large optical path changing angle θ1 as described using FIG. 3.

The wavelength demultiplexing filter 103a corresponds to the wavelength demultiplexing filter 3a whose top end and bottom end are cut at positions indicated by dotted lines shown in FIG. 5A in order to realize functions similar to those of the wavelength demultiplexing filter as the modification example of the first embodiment shown in FIG. 3. In this way, the parallelogram cross section shape is realized as shown in FIG. 5B. The wavelength demultiplexing filter 3a created by superimposing two triangular prisms 30 and 40 one on the other involves problems like the triangular prisms 30 and 40 bonded across the wavelength demultiplexing filter film 50 may be misaligned, causing the distal end portion of the triangular prism to protrude.

In this respect, since bottom surfaces 132 and 142 appear when the top and bottom ends of the wavelength demultiplexing filter 3a are cut as shown in FIG. 5A, subsequent working and handling become easier. When the plurality of wavelength demultiplexing filters 103a, 103b, 103c and 103d are used, angles of the respective wavelength demultiplexing filters can be aligned with the bottom surfaces 132 of the respective wavelength demultiplexing filters placed on the pedestal 111, positioning of the optical systems with respect to the optical axes of the laser beam λa and the laser beam λ1 becomes easier and assembly can also be easier.

Third Embodiment

Figure 6:
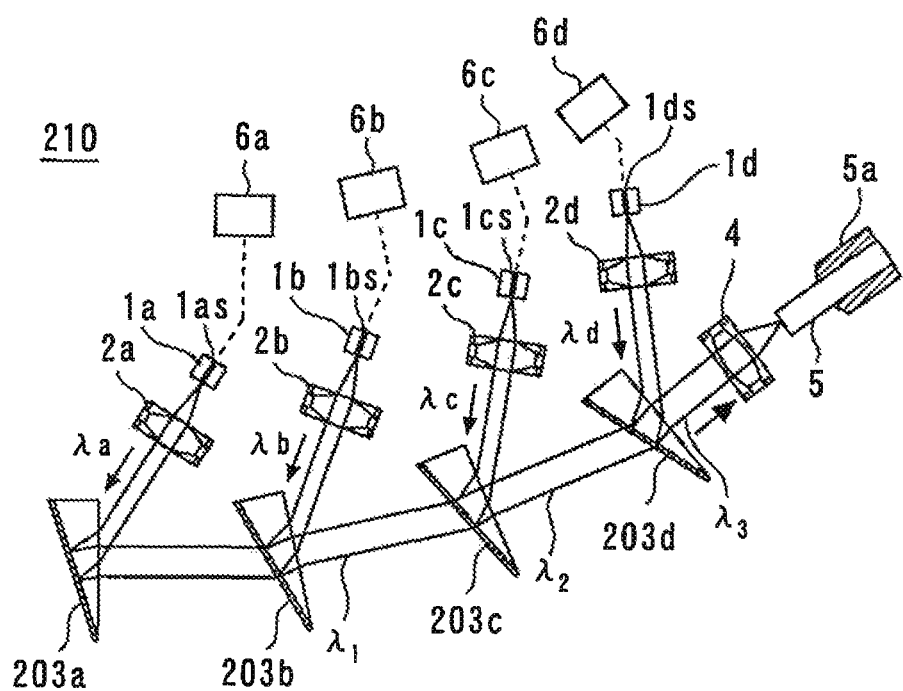
FIG. 6 is a diagram illustrating an overall configuration of an optical transmitting apparatus according to a third embodiment of the present invention.
Figure 7:
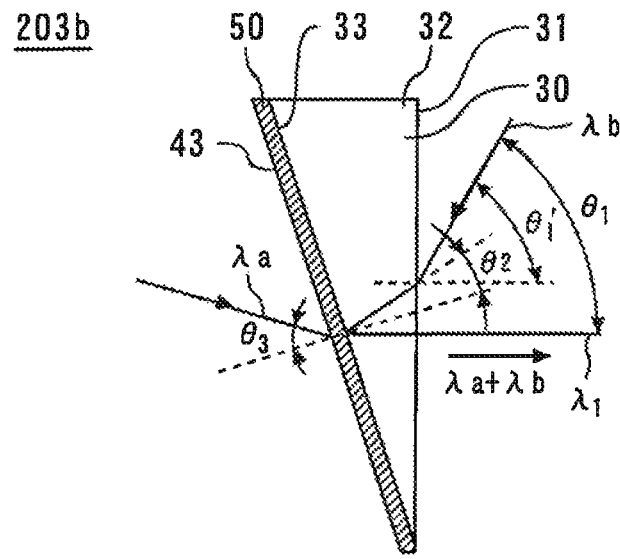
FIG. 7 is a diagram illustrating a configuration of a wavelength demultiplexing filter according to the third embodiment of the present invention.

FIG. 6 is a diagram illustrating an overall configuration of an optical transmitting apparatus 210 according to a third embodiment of the present invention. FIG. 7 is a diagram illustrating a configuration of a wavelength demultiplexing filter according to the third embodiment of the present invention, and is a diagram illustrating a configuration of a wavelength demultiplexing filter 203b as a typical example thereof.

The optical transmitting apparatus 210 according to the third embodiment is provided with a configuration similar to that of the optical transmitting apparatus 10 according to the first embodiment except in that wavelength demultiplexing filters 203a, 203b, 203c and 203d are used instead of the wavelength demultiplexing filters 3a, 3b, 3c and 3d. Here, the configuration of the wavelength demultiplexing filter 203b will be described as a typical example and description of the wavelength demultiplexing filters 203a, 203c and 203d will be omitted assuming that these are provided with a similar configuration.

As shown in FIG. 7, the wavelength demultiplexing filter 203b corresponds to the wavelength demultiplexing filter 3b from which the triangular prism 40 is removed and has a triangular prism shape as a whole. Such a configuration also allows the angle of incidence of the filter θ2 to be designed to be small while maintaining the relatively large optical path changing angle θ1 as described using FIG. 2.

However, what is different from the case in FIG. 2 is that, as an angle θ3 is assigned in FIG. 7, the angle of incidence θ3 with respect to the rear end face of the wavelength demultiplexing filter 203b (that is, rear end face 33 of the triangular prism 30) is necessary. This is different from the case in FIG. 2 where the laser beam λa impinges on the wavelength demultiplexing filter 3b perpendicularly.

Therefore, as shown in FIG. 6, the plurality of wavelength demultiplexing filters 203a, 203b, 203c and 203d need to be arranged bent with respect to each other so as to optically couple the multiplexed beams λ1, λ2 and λ3. This is different from the optical transmitting apparatus 10 shown in FIG. 1 in which a plurality of wavelength demultiplexing filters 3a, 3b, 3c and 3d are aligned rectilinearly along the optical axis of the optical fiber 5.

Fourth Embodiment

Figure 8:
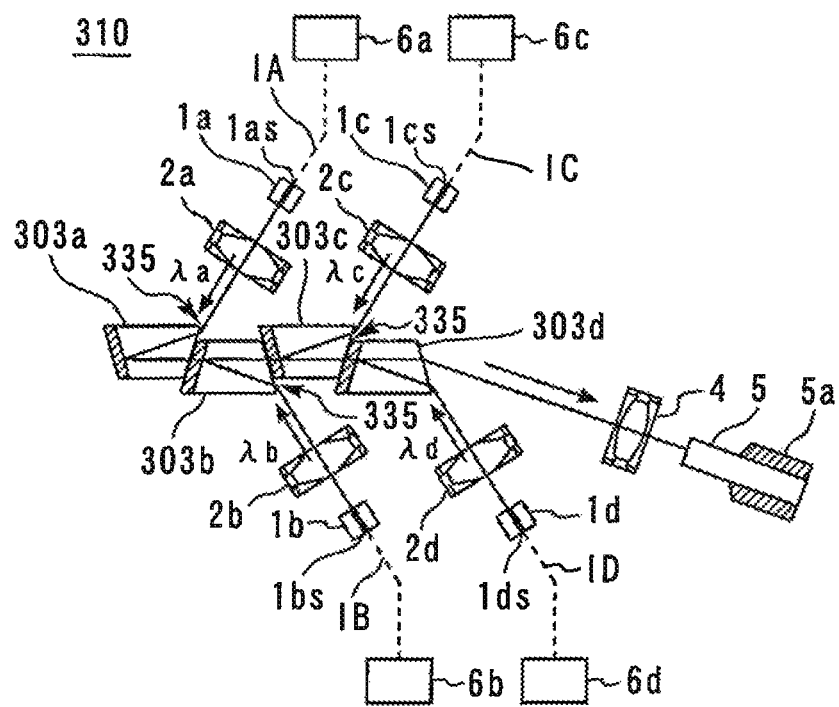
FIG. 8 is a diagram illustrating an overall configuration of an optical transmitting apparatus according to a fourth embodiment of the present invention.
Figure 9:
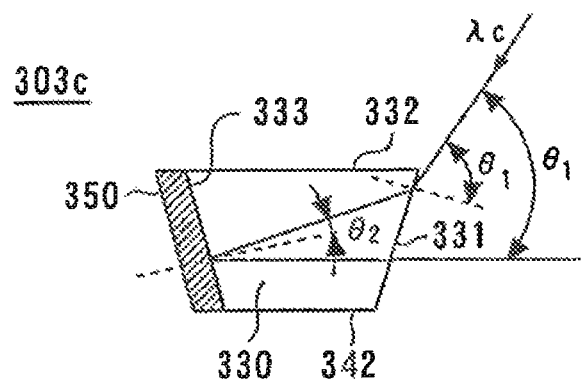
FIG. 9 is a diagram illustrating a configuration of a wavelength demultiplexing filter according to the fourth embodiment of the present invention.

FIG. 8 is a diagram illustrating an overall configuration of an optical transmitting apparatus 310 according to a fourth embodiment of the present invention. FIG. 9 is a diagram illustrating a configuration of a wavelength demultiplexing filter according to the fourth embodiment of the present invention and is a diagram illustrating a configuration of a wavelength demultiplexing filter 303c as a typical example thereof.

The optical transmitting apparatus 310 according to the fourth embodiment is provided with a configuration similar to that of the optical transmitting apparatus 10 according to the first embodiment except in that wavelength demultiplexing filters 303a, 303b, 303c and 303d are used instead of the wavelength demultiplexing filters 3a, 3b, 3c and 3d, and respective wavelength demultiplexing filters are arranged so as to contact each other. FIG. 9 describes a configuration of the wavelength demultiplexing filter 303c as a typical example and description of the wavelength demultiplexing filters 303a, 303b and 303d will be omitted assuming that these have configurations symmetric or similar thereto.

As shown in FIG. 9, in the fourth embodiment, the wavelength demultiplexing filter 303c is made up of a trapezoidal prism 330 and a wavelength demultiplexing filter film 350. The trapezoidal prism 330 is an isosceles trapezoidal prism provided with an upper base surface 342 and a lower base surface 332, and two slopes connecting the upper base surface 342 and the lower base surface 332. One slope is a front end face 331 and the other slope is a rear end face 333.

The two neighboring wavelength demultiplexing filters 303b and 303c are arranged with the front end face 331 and the wavelength demultiplexing filter film 350 contacting each other. Furthermore, the two neighboring isosceles trapezoidal prisms are arranged with the upper base surface 342 and the lower base surface 332 located at different levels, and an exposed portion 335 is thereby provided at part of each front end face 331. The respective laser beams λa, λb, λc, and λd impinge on their respective exposed portions 335.

Here, for convenience, the semiconductor laser element and the wavelength demultiplexing filter are assumed to be one set of part groups and a relationship between two neighboring sets of part groups will be described. When, for example, the semiconductor laser element 1a and the wavelength demultiplexing filter 303a are specified as a first set, a second set is the semiconductor laser element 1b and the wavelength demultiplexing filter 303b adjacent thereto. On the other hand, when the semiconductor laser element 1b and the wavelength demultiplexing filter 303b are specified as the first set, the second set is the semiconductor laser element 1c and the wavelength demultiplexing filter 303c adjacent thereto.

The wavelength demultiplexing filter 303b belonging to the first set and the wavelength demultiplexing filter 303c belonging to the second set adjacent thereto have shapes symmetric with respect to the optical axis of the optical fiber 5, that is, shapes upside down with respect to the surface of the sheet in FIG. 8. Moreover, the semiconductor laser element 1b belonging to the first set and the semiconductor laser element 1c belonging to the second set emit laser beams λb and λc to the respective wavelength demultiplexing filters 303b and 303c from opposite directions across the optical axis of the optical fiber 5. In other words, in the optical transmitting apparatus 310 according to the fourth embodiment, the second set adjacent to the first set is rotated around the optical axis of the optical fiber 5 and shifted with respect to the first set.

Thus, the fourth embodiment combines trapezoidal prisms and causes laser beams to impinge alternately from directions perpendicular to the optical axis direction of the multiplexed beam (in other words, optical axis direction of the optical fiber 5). Adopting this configuration can omit the rear prism (triangular prism 40) of the wavelength demultiplexing filter 3b or the like of the first embodiment and thereby realize a cost reduction.

Note that in the optical transmitting apparatus 310 according to the fourth embodiment shown in FIG. 8, the first set (semiconductor laser element 1a and the wavelength demultiplexing filter 303a) and the second set (semiconductor laser element 1b and the wavelength demultiplexing filter 303b) are arranged in symmetric shapes and in a symmetric positional relationship with respect to the optical axis of the optical fiber 5. That is, a following set is arranged in a shape symmetric and in a positional relationship symmetric to a preceding set with respect to the optical axis of the optical fiber 5.

Similarly, "neighboring sets of the semiconductor laser element and wavelength demultiplexing filter" may also be arranged symmetrically with respect to the optical axis of the optical fiber 5 in the optical transmitting apparatus 10 according to the first embodiment, the optical transmitting apparatus 110 according to the second embodiment and the optical transmitting apparatus 210 according to the third embodiment.

Fifth Embodiment

Figure 10:
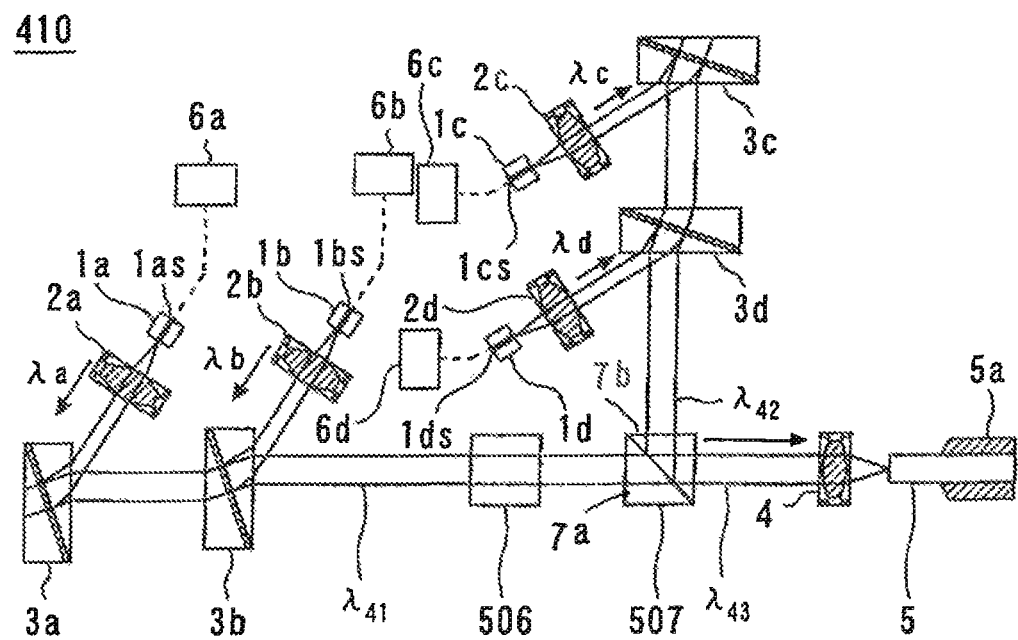
FIG. 10 is a diagram illustrating an overall configuration of an optical transmitting apparatus according to a fifth embodiment of the present invention.

FIG. 10 is a diagram illustrating an overall configuration of an optical transmitting apparatus 410 according to a fifth embodiment of the present invention. The optical transmitting apparatus 410 is provided with a Faraday rotator 506 and a polarization beam splitter 507. While the optical transmitting apparatus 410 is provided with components such as wavelength demultiplexing filters 3a, 3b, 3c, and 3d having the same configurations, their arrangement is different from that of the optical transmitting apparatus 10.

The polarization beam splitter 507 is provided with a first surface 7a and a second surface 7b that intersects the first surface 7a perpendicularly. The polarization beam splitter 507 is provided between the wavelength demultiplexing filter 3b and an optical fiber 5 and receives a multiplexed beam λ41 on the first surface 7a. A multiplexed beam λ42 impinges on the second surface 7b of the polarization beam splitter 507.

The multiplexed beam λ41 is a beam obtained by multiplexing a laser beam λa and a laser beam λb using the wavelength demultiplexing filter 3b. This is the same as the multiplexed beam λ1 in the optical transmitting apparatus 10 of the first embodiment. On the other hand, the multiplexed beam λ42 is a beam obtained by multiplexing a laser beam λc and a laser beam λd using the wavelength demultiplexing filter 3c.

That is, in the optical transmitting apparatus 410, a first component group of semiconductor laser elements 1a and 1b, and wavelength demultiplexing filters 3a and 3b or the like, and a second component group of semiconductor laser elements 1c and 1d, and wavelength demultiplexing filters 3c and 3d or the like cause the multiplexed beams λ41 and λ42 which are orthogonal to each other to impinge on one polarization beam splitter 507.

As a result, the optical transmitting apparatus 410 can also synthesize polarized waves using the polarization beam splitter 507. This eliminates the necessity for each of the wavelength demultiplexing filters 3a, 3b, 3c and 3d to have sharp wavelength demultiplexing characteristics and can provide allowance for characteristics of the wavelength demultiplexing filter.

Sixth Embodiment

Figure 13:
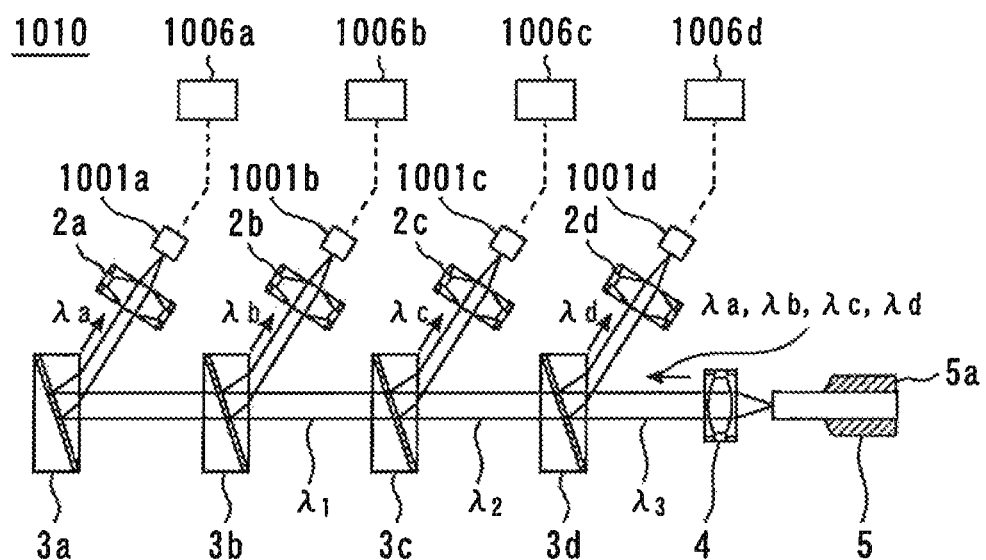
FIG. 13 is a diagram illustrating an optical receiving apparatus according to a sixth embodiment of the present invention.

FIG. 13 is a diagram illustrating an optical receiving apparatus 1010 according to a sixth embodiment of the present invention. The optical receiving apparatus 1010 corresponds to the optical transmitting apparatus 10 according to the first embodiment with the semiconductor laser elements 1a, 1b, 1c and 1d replaced by photodiodes 1001a, 1001b, 1001c, and 1001d. Furthermore, light receiving circuits 1006a, 1006b, 1006c and 1006d including an amplifier or the like are provided instead of the laser drive circuits 6a, 6b, 6c and 6d. Thus, it is possible to reduce the angle of incidence of the filter θ2 while maintaining the optical path changing angle θ1 as in the case of the optical transmitting apparatus 10.

In the aforementioned sixth embodiment, the photodiode 1001a and the lens 2a correspond to a "first laser beam receiving section" according to the above-described second invention and the laser beam λa corresponds to a "first laser beam" according to the above-described second invention. Furthermore, in the aforementioned sixth embodiment, the photodiode 1001b and the lens 2b correspond to a "second laser beam receiving section" according to the above-described second invention and the laser beam λb corresponds to a "second laser beam" according to the above-described second invention Moreover, in the aforementioned sixth embodiment, the wavelength demultiplexing filter 3b corresponds to a "wavelength filter section" according to the above-described second invention and the optical fiber 5 corresponds to an "optical fiber" and the fiber fixing section 5a corresponds to a "fiber fixing section." In the aforementioned sixth embodiment, the triangular prism 30 corresponds to a "prism" according to the above-described second invention and the wavelength demultiplexing filter film 50 corresponds to a "wavelength filter film."

Note that between the first embodiment and the sixth embodiment, the semiconductor laser elements 1a, 1b, 1c and 1d are replaced by the photodiodes 1001a, 1001b, 1001c and 1001d, and the laser drive circuits 6a, 6b, 6c and 6d are replaced by the light receiving circuits 1006a, 1006b, 1006c and 1006d, and similar modifications can also be made among the second to fifth embodiments.

Figure 14:
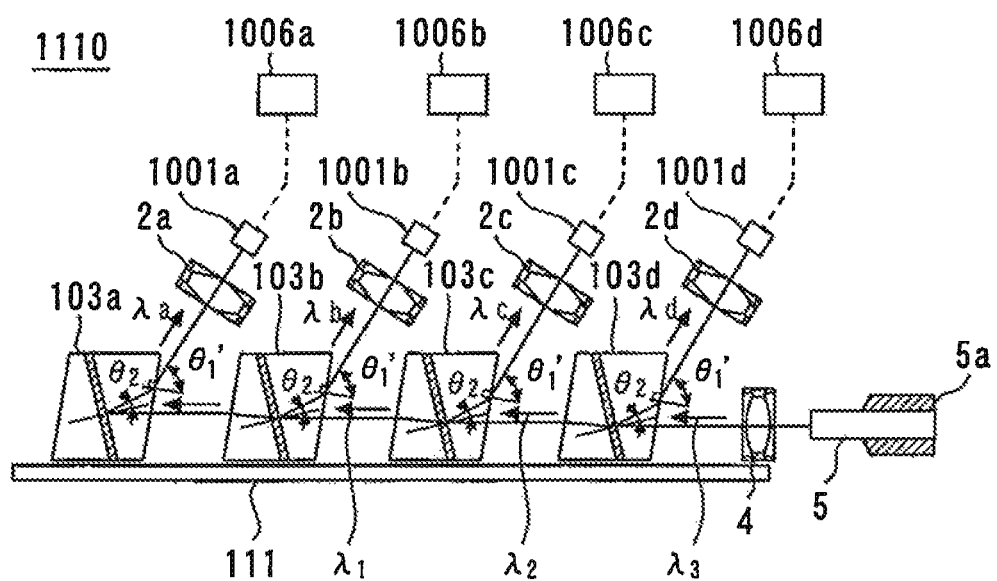
FIG. 14 is a diagram illustrating an optical receiving apparatus as a modification example of the optical receiving apparatus according to the sixth embodiment of the present invention.

To be more specific, FIG. 14 is a diagram illustrating an optical receiving apparatus 1110 as a modification example of the optical receiving apparatus according to the sixth embodiment of the present invention. This corresponds to the optical transmitting apparatus 110 according to the second embodiment with the semiconductor laser elements and the laser drive circuits replaced by photodiodes and light receiving circuits as described above.

Figure 15:
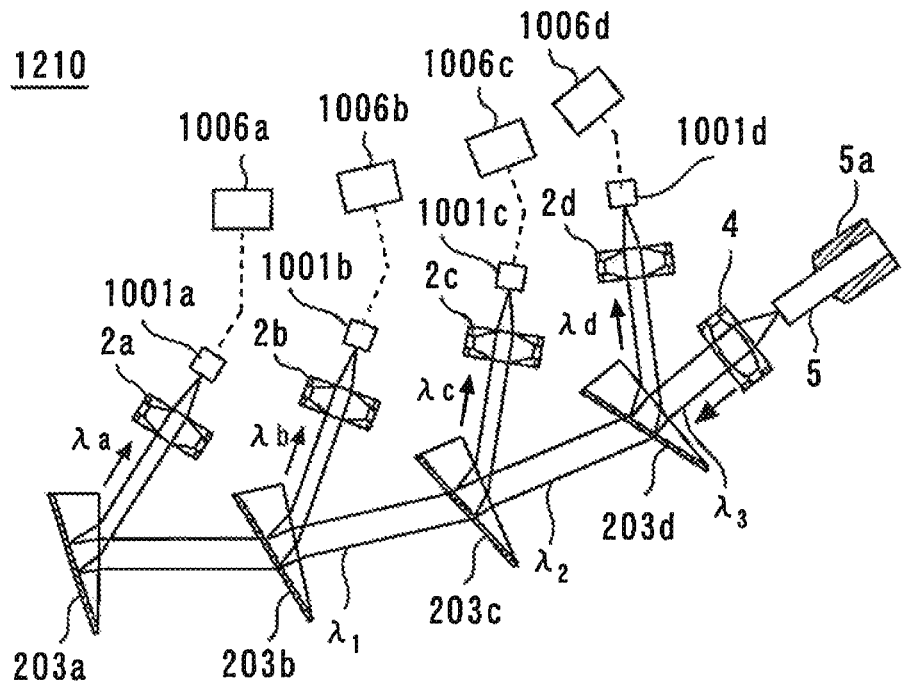
FIG. 15 is a diagram illustrating an optical receiving apparatus as another modification example of the optical receiving apparatus according to the sixth embodiment of the present invention.

FIG. 15 is a diagram illustrating an optical receiving apparatus 1210 as another modification example of the optical receiving apparatus according to the sixth embodiment of the present invention. This corresponds to the optical transmitting apparatus 210 according to the third embodiment with the semiconductor laser elements and the laser drive circuits replaced by photodiodes and light receiving circuits as described above.

Figure 16:
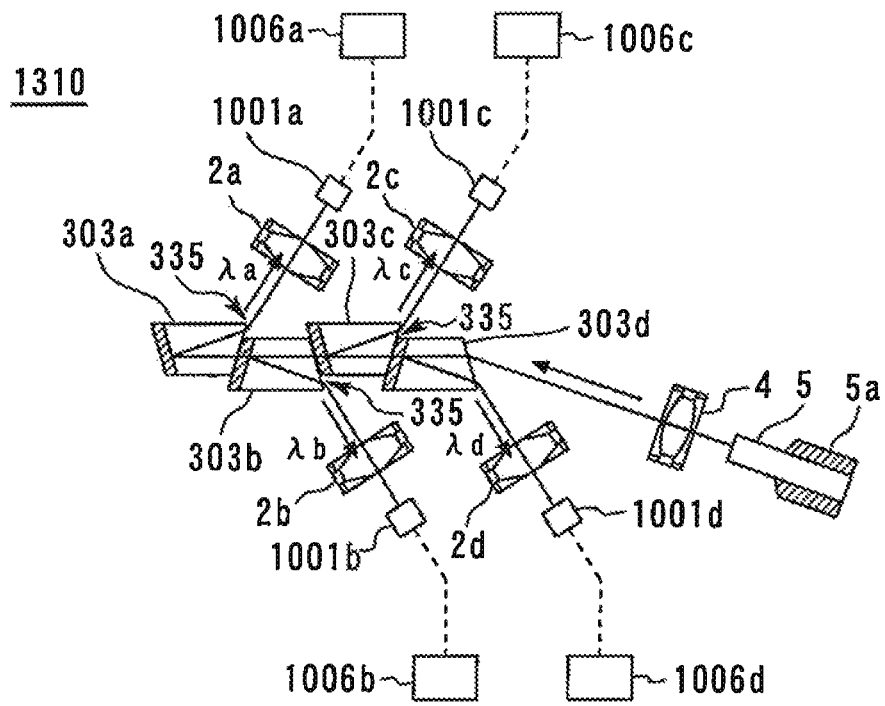
FIG. 16 is a diagram illustrating an optical receiving apparatus as a further modification example of the optical receiving apparatus according to the sixth embodiment of the present invention.

FIG. 16 is a diagram illustrating an optical receiving apparatus 1310 as a further modification example of the optical receiving apparatus according to the sixth embodiment of the present invention. This corresponds to the optical transmitting apparatus 310 according to the fourth embodiment with the semiconductor laser elements and the laser drive circuits replaced by photodiodes and light receiving circuits as described above.

Figure 17:
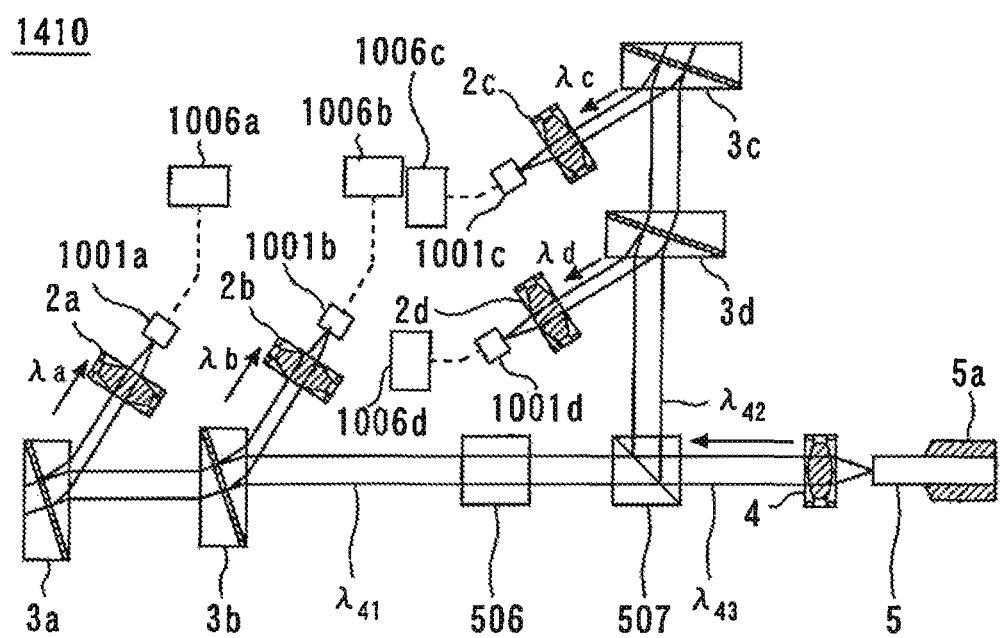
FIG. 17 is a diagram illustrating an optical receiving apparatus as a still further modification example of the optical receiving apparatus according to the sixth embodiment of the present invention.

FIG. 17 is a diagram illustrating an optical receiving apparatus 1410 as a still further modification example of the optical receiving apparatus according to the sixth embodiment of the present invention. This corresponds to the optical transmitting apparatus 410 according to the fifth embodiment with the semiconductor laser elements and the laser drive circuits replaced by photodiodes and light receiving circuits as described above.

By so doing, the optical transmitting apparatuses 110 to 410 according to the second to fifth embodiments can be modified to and used as the optical receiving apparatuses 1110 to 1410. In this way, it is possible to practically achieve the various effects described in the first to fifth embodiments such as compatibility between the optical path changing angle and the angle of incidence of the filter.

The features and advantages of the present invention may be summarized as follows. According to the present invention, it is possible to make a requirement for increasing an optical path changing angle compatible with a requirement for decreasing an angle of incidence of a filter.

Obviously many modifications and variations of the present invention are possible in the light of the above teachings. It is therefore to be understood that within the scope of the appended claims the invention may be practiced otherwise than as specifically described.

The entire disclosure of Japanese Patent Application No. 2013-066505, filed on Mar. 27, 2013, including specification, claims, drawings, and summary, on which the Convention priority of the present application is based, is incorporated herein by reference in its entirety.

What is claimed is:

1. An optical transmitting apparatus comprising:
an optical fiber for propagation of optical beams, wherein the optical fiber has an optical axis;
a first laser emitting section that emits a first laser beam having a first wavelength;
a plurality of second laser emitting sections, wherein each second laser emitting section emits a respective second laser beam having a wavelength different from the first wavelength and different from the wavelengths emitted by other second laser emitting sections; and
a plurality of wavelength filter sections, wherein
the wavelength filter sections are arranged, optically, in series,
each second laser emitting section is associated with a corresponding one of the wavelength filter sections of the plurality of wavelength filter sections,
the first laser beam is incident on a first wavelength filter section of the plurality of wavelength filter sections that are arranged in series and is emitted to a successive wavelength filter section of the plurality of wavelength filter sections that are arranged in series,
each of the wavelength filter sections, after the first of the wavelength filter sections, receives a laser beam emitted from a preceding wavelength filter section, of the plurality of wavelength sections that are arranged in series, and the second laser beam of the second laser emitting section corresponding to the respective wavelength filter section, and emits a multiplexed beam obtained by multiplexing the laser beam emitted by the preceding wavelength filter section and the second laser beam emitted by the second laser emitting section corresponding to the respective wavelength filter section, and
each of the wavelength filter sections comprises
a prism that includes a front end face and a rear end face, wherein the front end face faces the rear end face, the second laser beam of the second laser emitting section corresponding to the respective wavelength filter section is incident on the front end face of the prism, the first laser beam is incident on the rear end face of the prism of the first wavelength filter section, and a respective one of the multiplexed beams is incident on the rear end face of the prism of the wavelength filter sections succeeding the first wavelength filter section, and
a wavelength filter film that is located on the rear end face of the prism, that transmits the laser beam that is incident on the rear end face of the prism, that reflects the second laser beam that is incident on the front end face of the prism, and that multiplexes the laser beams that are incident on the rear end face and the front end face of the prism,
the front end face and the rear end face of the prism are not parallel to each other so that a prism angle, which is an angle at which a surface parallel to the front end face intersects a surface parallel to the rear end face, is an acute angle, and
the prism angle is the angle at which the laser beam, incident on the front end face of the prism, is reflected by the wavelength filter film toward the front end face of the prism, and at which the multiplexed beam is directed toward the optical axis of the optical fiber.

2. The optical transmitting apparatus according to claim 1, wherein when an angle formed between an optical axis of the multiplexed beams and optical axes of the second laser beams is an optical path changing angle, and when an angle of incidence of the second laser beams on the front end faces of the prisms is an angle of incidence of the prisms, then the front end faces of the prisms are inclined with respect to the optical axis of the multiplexed beams so that the angle of incidence of prisms exceeds the optical path changing angle.

3. The optical transmitting apparatus according to claim 1, wherein the plurality of the second laser emitting sections and of the wavelength filter sections corresponding to the respective second laser emitting sections comprise a first set of the wavelength filter sections and the corresponding second laser emitting sections, and a second set of the wavelength filter sections and the corresponding second laser emitting sections, the second set is located adjacent to the first set, the wavelength filter sections of the first set and the wavelength filter sections of the second set have shapes that are symmetrical with respect to the optical axis of the optical fiber, and the second laser emitting sections of the first set and the second laser emitting sections of the second set respectively emit laser beams to the corresponding wavelength filter sections from opposite directions, across the optical axis of the optical fiber.

4. The optical transmitting apparatus according to claim 3, wherein each of the prisms of the wavelength filter sections has a shape, in cross-section, of an isosceles trapezoidal prism comprising an upper base surface, a lower base surface, and two sloping surfaces connecting the upper base surface to the lower base surface, and a first of the two sloping surfaces is the front end face of the prism and a second of the two sloping surfaces is the rear end face of the prism, neighboring wavelength filter sections are arranged with the front end face of the prism contacting the wavelength filter film, and neighboring isosceles trapezoidal prisms are arranged with the upper base surface and the lower base surface at different levels, providing exposed portions at part of the respective front end faces of the prisms, and the second laser emitting sections emit the respective second laser beams to be incident on the exposed portions of the respective prisms.

5. The optical transmitting apparatus according to claim 1, wherein each of the wavelength filter sections further comprises a rear prism that has the same refractive index as the prism, that sandwiches, together with the prism, the wavelength filter film, and that includes a surface on which one of the first laser beam and a respective one of the multiplexed beams is incident, on a side opposite the surface of the rear prism that contacts the wavelength filter film, and the front end face of the prism and the surface of the rear prism are parallel to each other.

6. The optical transmitting apparatus according to claim 5, wherein the prism includes a bottom surface.

7. An optical transmitting apparatus comprising:
an optical fiber for propagation of optical beams, wherein the optical fiber has an optical axis;

a first laser emitting section that emits a first laser beam having a first wavelength;

a second laser emitting section that emits a second laser beam having a second wavelength different from the first wavelength;

a wavelength filter section that receives the first laser beam and the second laser beam, and emits a multiplexed beam obtained by multiplexing the first laser beam and the second laser beam, wherein the wavelength filter section comprises:
a prism that includes a front end face and a rear end face, facing each other, that receives the second laser beam on the front end face and receives the first laser beam on the rear end face, and a wavelength filter film that is located on the rear end face, that transmits the first laser beam that is incident on the rear end face, that reflects the second laser beam that is incident on the front end face, and that multiplexes the first laser beam and the second laser beam, the front end face and the rear end face are not parallel to each other so that a prism angle, which is an angle at which a surface parallel to the front end face intersects a surface parallel to the rear end face, is an acute angle, and the prism angle is the angle at which the second laser beam, incident on the front end face of the prism, is reflected by the wavelength filter film toward the front end face of the prism, and at which the multiplexed beam is directed toward the optical axis of the optical fiber;

a polarization beam splitter that is located between the wavelength filter section and the optical fiber and that receives the multiplexed beam on a first surface of the polarization beam splitter; and a third laser emitting section that emits a laser beam that is incident on a second surface of the polarization beam splitter, wherein the second surface of the polarization beam splitter is perpendicular to the first surface of the polarization beam splitter.

8. An optical detecting apparatus comprising:
an optical fiber for propagation of optical beams, wherein the optical fiber has an optical axis;

a plurality of wavelength filter sections, wherein
the plurality of wavelength filter sections are arranged, optically, in series a first wavelength filter section of the plurality of wavelength filter sections receives a multiplexed beam obtained by multiplexing a first laser beam having a first wavelength and a plurality of second laser beams, each second laser beam having a wavelength different from the first wavelength and different from the wavelengths of other second laser beams, the plurality of wavelength filter sections demultiplexes the multiplexed beam into the first laser beam and the respective second laser beams;

a first laser beam detecting section detecting the first laser beam;

a plurality of second laser beam detecting sections, wherein each second laser beam detecting section detects a respective one of the second laser beams, wherein each of the wavelength filter sections comprises
a prism that includes
a front end face and a rear end face, wherein
the front end face faces the rear end face,
the front end face and the rear end face are not parallel to each other so that a surface parallel to the front end face and a surface parallel to the rear end face intersect each other at an acute prism angle, the multiplexed beam is incident on the front end face of a first wavelength filter section of the plurality of wavelength filter sections, and a respective multiplexed beam is incident on the front end face of each wavelength filter section of the plurality of wavelength filter sections, other than the first wavelength filter section, one of the second laser beams corresponding to a respective one of the second laser beam detecting sections is emitted from the front end face of the prism, one of the respective multiplexed beams is emitted from the rear end face of the prism, except for a last of the wavelength filter sections, the one of the respective multiplexed beams corresponding to the respective multiplexed beam incident on the front end face of the prism, less the corresponding second laser beam that is emitted from the front end face of the prism, and the first laser beam is emitted from the rear end face of the prism that is the last of the wavelength filter sections, and a wavelength filter film that is located on the rear end face of the prism, that reflects a corresponding one of the second laser beams that is incident on the front end face of the prism, and that transmits the respective multiplexed beam that is incident on the front end face, less the corresponding second laser beam that is emitted from the front end face, thereby demultiplexing the corresponding second laser beam, wherein the prism angle is the angle at which the corresponding second laser beam incident on the front end face of the prism is reflected by the wavelength filter film and the corresponding second laser beam is directed to the respective one of the second laser beam detecting sections.

9. The optical detecting apparatus according to claim 8, wherein when an angle formed between an optical axis of the multiplexed beam and optical axes of the second laser beams is an optical path changing angle, and when an angle of incidence of the second laser beams on the front end faces of the prisms is an angle of incidence of the prisms, then the front end faces of the prisms are inclined with respect to the optical axis of the multiplexed beam so that the angle of incidence of the prisms exceeds the optical path changing angle.

10. The optical detecting apparatus according to claim 8, wherein the plurality of the second laser beam detecting sections and of the wavelength filter sections corresponding to the respective second laser beam detecting sections comprise a first set of the wavelength filter sections and the corresponding second laser beam detecting sections, and a second set of the wavelength filter sections and the corresponding second laser beam detecting sections, the second set is located adjacent to the first set, the wavelength filter sections of the first set and the wavelength filter sections of the second set have shapes that are symmetrical with respect to the optical axis of the optical fiber, and the second laser beam detecting sections of the first set and the second laser beam detecting sections of the second set respectively detect laser beams to the corresponding wavelength filter sections from opposite directions, across the optical axis of the optical fiber.

11. The optical detecting apparatus according to claim 10, wherein each of the prisms of the wavelength filter sections has a shape, in cross-section, of an isosceles trapezoidal prism comprising an upper base surface, a lower base surface, and two sloping surfaces connecting the upper base surface to the lower base surface, and a first of the two sloping surfaces is the front end face of the prism and a second of the two sloping surfaces is the rear end face of the prism, neighboring wavelength filter sections are arranged with the front end face of the prism contacting the wavelength filter film, and neighboring isosceles trapezoidal prisms are arranged with the upper base surface and the lower base surface at different levels, providing exposed portions at part of the respective front end faces of the prisms, and the second laser beam detecting sections are arranged on optical axes of the second laser beams emitted from the respective exposed portions of the respective prisms.

12. The optical detecting apparatus according to claim 8, wherein each of the wavelength filter sections further comprises a rear prism that has the same refractive index as the prism, that sandwiches, together with the prism, the wavelength filter film, and that includes a surface on which one of the first laser beams and a respective multiplexed beam is incident, on a side opposite the surface of the rear prism that contacts the wavelength filter film, and the front end face of the prism and the surface of the rear prism are parallel to each other.

13. The optical detecting apparatus according to claim 12, wherein the prism includes a bottom surface.

14. An optical detecting apparatus comprising:

a wavelength filter section that receives a multiplexed beam obtained by multiplexing a first laser beam having a first wavelength and a second laser beam having a second wavelength different from the first wavelength, and demultiplexes the multiplexed beam into the first laser beam and the second laser beam;

a first laser beam detecting section for detecting the first laser beam;

a second laser beam detecting section for detecting the second laser beam;

an optical fiber that transmits the multiplexed beam to the wavelength filter section, wherein the wavelength filter section comprises:

a prism that includes a front end face and a rear end face facing each other, that receives the multiplexed beam on the front end face, that emits the second laser beam from the front end face, and that emits the first laser beam from the rear end face; and a wavelength filter film that is located on the rear end face of the prism, that transmits the first laser beam that is emitted from the rear end face of the prism, and that reflects the second laser beam that is incident on the front end face of the prism, and that demultiplexes the first laser beam and the second laser beam, the front end face and the rear end face are not parallel to each other so that a surface parallel to the front end face and a surface parallel to the rear end face intersect each other at an acute prism angle, and the prism angle is the angle at which the second laser beam of the multiplexed beam incident on the front end face of the prism is reflected by the wavelength filter film, and the second laser beam is directed to the second laser beam detecting section;

a polarization beam splitter that is located between the wavelength filter section and the optical fiber and that receives the multiplexed beam from the optical fiber on a first surface of the polarization beam splitter; and a third laser beam detecting section located to detect a third laser beam that is emitted from a second surface of the polarization beam splitter, wherein the second surface of the polarization beam splitter is perpendicular to the first surface, of the polarization beam splitter.

* * * * *